July 31, 1923.
A. NORREL
1,463,224
APPARATUS FOR TRUING UP COMMUTATORS, HIP RINGS, DRUMS, AND THE LIKE
Filed March 31, 1921
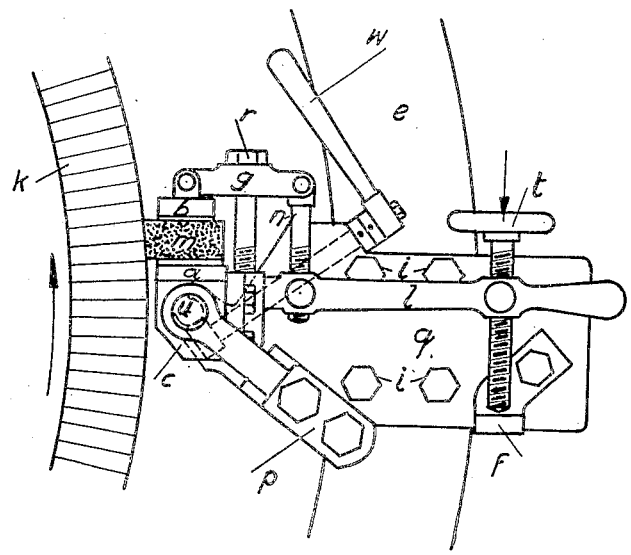
Fig. 1
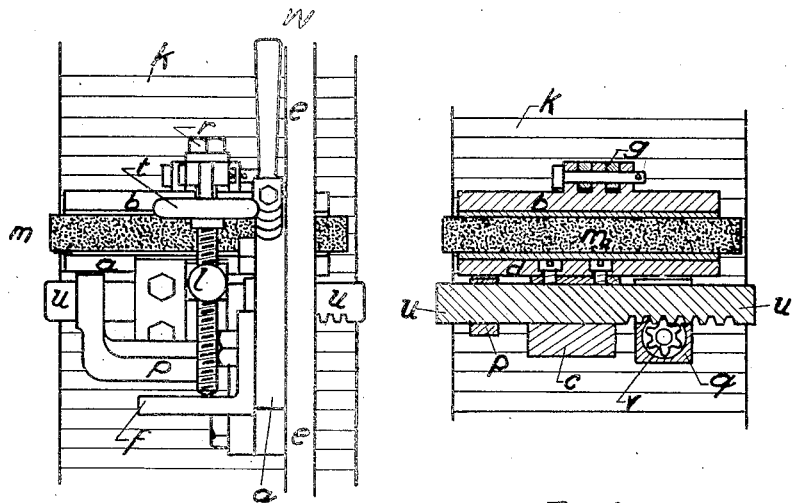
Fig. 2.
Fig. 3.
Inventor
A Norrel,
By Marks&Clerk
Attys.

Patented July 31, 1923.

1,463,224

UNITED STATES PATENT OFFICE.

ANDERS NORREL, OF ZURICH, SWITZERLAND.

APPARATUS FOR TRUING UP COMMUTATORS, HIP RINGS, DRUMS, AND THE LIKE.

Application filed March 31, 1921. Serial No. 457,487.

*To all whom it may concern:*

Be it known that I, ANDERS NORREL, a subject of the King of Sweden, and residing at Gartenstrasse 11, Zurich, Switzerland, have invented certain new and useful Improvements in Apparatus for Truing Up Commutators, Hip Rings, Drums, and the like (for which I have filed applications in Great Britain, Nov. 24, 1916; Switzerland, Nov. 15, 1916; Spain, June 21, 1917; Belgium, Nov. 22, 1917; Canada, Feb. 22, 1917; Russia, Mar. 13/26, 1917; Finland, Jan. 30, 1917; Hungary, Nov. 7, 1917; Sweden and Norway, Nov. 29, 1916; and Netherland, Dec. 1, 1916), of which the following is a specification.

By my Patent No. 1,249,655 an apparatus for truing up commutators of electric machines was made known, the arrangement of which is, in the main, as follows:—

A grinding block is held stationary in clamping device by means of a screw and can be adjusted radially to the commutator by a movement around a screw embedded in two bearings which penetrates the setting-up piece of the clamping device, and can further, by a twist of the screw, be adjusted longitudinally to the commutator. The radial adjustment is effected by means of a regulating screw.

Owing to the fact that the movement of the grindstone takes place round a screw moving in two bearings, and this screw penetrates the setting-up piece of the clamping device of the grindstone as screw-nut, there results the inconvenience that the holder of the grindstone can be more or less slightly moved from its place at each adjustment owing to the clearance in the bearings and the nut-worm.

The clearance in the screw bearings is constantly increased by the uninterrupted turning of the same during the process of grinding either to the right or the left. The clearance is still greater in the nut-worm of the foundation of the grindstone holder, where it cannot, in any case, be avoided. The consequence is, that as already mentioned, the grindstone can always move itself slightly and never remains absolutely fixed in one adjusted position. Hence it is not possible to grind a surface perfectly round.

This not inconsiderable inconvenience is now completely removed by the invention herein described by the fact that the axis on which the movement of the grindstone takes place has been chosen in the form of a shaft forming a stationary whole with the setting-up piece of the grindstone holder. The shaft is placed without any bearing clearance in two or more bearings, by which means the shaft does not turn quite round but is only slightly turned and slowly moved axially to and fro. The shaft is provided wholly or partly with cogs which are caught by a firmly fixed cogwheel. This cogwheel can likewise be turned by a key or wrench in the shape of a handwheel whereby the grindstone is moved to and fro.

The adjustment of the grindstone in a radial direction is the same as specified in my Patent 1,249,655 and is also carried out by means of a regulating screw placed on a prolongation of the setting-up piece of the grindstone holder and resting permanently against one of the shafts of the apparatus.

For a full understanding of the invention reference is to be made to the drawings:

Fig. 1 is a side elevation of the apparatus,

Fig. 2 an end elevation, and

Fig. 3 a section on a central line taken through the rack.

The apparatus is secured by means of the screws $i$ to part $e$ the solid part of the machine; the commutator, slip rings, etc. of which are to be ground. This mounting of the device is to be carried out in such a way that the shaft $u$—$u$ runs parallel to the surface to be polished. The grindstone $m$, which may be as long as the surface to be polished, or even longer, is fastened between two clamps $a$ and $b$ by means of the screw $r$. A clearance angle may be fixed behind the grindstone so as to hold it absolutely firm. The setting-up piece $c$ of the grindstone holder is penetrated by the shaft $u$—$u$ and forms with it a fixed piece. The shaft $u$—$u$, which is partly provided with cogs, is placed in the bearings $p$ and $q$ without any clearance. A cogwheel $v$ engages the teeth of the shaft, and this cogwheel can be turned by an arm or bracket $w$, by which means the axial adjustment of the grindstone is obtained. An arm $l$ is firmly screwed to the setting-up piece $c$ of the grindstone holder, which arm is provided with a regulating screw $t$. The regulating screw $t$ leans permanently against the plate $f$ lying parallel to the shaft $u$—$u$, by which the radial adjustment of the grindstone remains unaltered when the stone is moved to and fro in an axial direction. As soon as the screw t is slightly screwed in, the grindstone adjusts itself somewhat nearer to the axis of the shaft u—u owing to its movement. By the dead weight of the arm l with the screw t the latter rests permanently on the plate f, as indicated by the arrow over the screw t in the drawing.

By means of an arrangement of this kind the grindstone cannot possibly slip out of its adjustment; hence much more accurate grinding is possible so that the apparatus is suitable for grinding all kinds of objects necessitating a rounded surface, such as commutators, slip rings, drums and the like.

Should it not be found possible in a certain machine to fix the apparatus horizontally, as in Fig. 1, the regulating screw t can be provided with a stop device. It is also possible to adjust the regulating screw t as well as the cogwheel v for automatic adjustment of the grindstone, by means already in use, either in a radial or an axial direction.

The apparatus can likewise, for instance, be fixed to a lathe support and then employed for grinding shafts, drums, plates for generator armatures, etc.

Having now described my invention, what I claim as new and desire to secure by Letters Patent in the United States, is:—

1. An apparatus for truing commutators, hip rings, and the like, comprising a shaft, a grinding member, a holder for said grinding member secured to said shaft, means pivotally supporting said shaft and permitting a swinging adjusting movement of the holder and grinding member whereby the latter may be adjusted substantially radially of the work to be trued, means for maintaining the grinding block in predetermined position with respect to said work regardless of irregularities in the surface of the latter, and means for shifting said shaft to adjust the grinding block and the holder in the direction of the axis of the work.

2. An apparatus for truing commutators, hip rings and the like comprising a shaft, a grinding member, a holder for said grinding member secured to said shaft, means pivotally supporting said shaft and permitting a swinging adjusting movement of the holder and grinding member whereby the latter may be adjusted substantially radially of the work to be trued, a plate lying parallel to said shaft, and an adjustable member engaging said plate and operatively maintaining the holder and grinding member in predetermined position with respect to the work regardless of irregularities in the surface of the latter.

3. An apparatus for truing commutators, hip rings and the like comprising a shaft, a grinding member, a holder for said grinding member secured to said shaft, means pivotally supporting said shaft and permitting swinging movement of the holder and grinding member whereby the latter may be adjusted substantially radially of the work to be trued, a plate lying parallel to said shaft, an adjustable member engaging said plate and operatively maintaining the holder and grinding member in predetermined position with respect to the work regardless of irregularities in the surface of the latter, and means for shifting the grinding member and holder in the direction of the axis of the work, said adjustable member sliding over said plate during shifting of the grinding member and holder.

4. An apparatus for truing commutators, hip rings and the like comprising a shaft, a grinding member, a holder for said grinding member secured to said shaft, means pivotally supporting said shaft and permitting swinging movement of the holder and grinding member whereby the latter may be adjusted substantially radially of the work to be trued, a plate lying parallel to said shaft, and an adjustable member engaging said plate and operatively maintaining the holder and grinding member in predetermined position with respect to the work regardless of irregularities in the surface of the latter, said shaft having teeth thereon, and means coacting with said teeth to shift the shaft axially to move the grinding member across the face of the work.

In testimony whereof, I have signed my name to this specification.

ANDERS NORREL.